United States Patent
Leach et al.

(10) Patent No.: US 11,686,582 B2
(45) Date of Patent: Jun. 27, 2023

(54) SENSOR PLAUSIBILITY USING GPS ROAD INFORMATION

(71) Applicant: ARRIVER SOFTWARE LLC, Novi, MI (US)

(72) Inventors: William M. Leach, West Bloomfield, MI (US); Kurt Pauli, South Lyon, MI (US); Sylvia Pietzsch, Billdal (SE)

(73) Assignee: Arriver Software LLC, Novi, MI (US)

(*) Notice: Subject to any disclaimer, the term of this patent is extended or adjusted under 35 U.S.C. 154(b) by 329 days.

(21) Appl. No.: 15/928,802

(22) Filed: Mar. 22, 2018

(65) Prior Publication Data
US 2019/0291742 A1 Sep. 26, 2019

(51) Int. Cl.
*B60W 50/02* (2012.01)
*B60W 50/00* (2006.01)
(Continued)

(52) U.S. Cl.
CPC ..... *G01C 21/1656* (2020.08); *B60W 50/0097* (2013.01); *B60W 50/0205* (2013.01); *G01C 21/1652* (2020.08); *G01C 21/1654* (2020.08); *G01C 21/28* (2013.01); *B60W 2050/0215* (2013.01); *B60W 2520/105* (2013.01); *B60W 2520/125* (2013.01); *B60W 2520/14* (2013.01); *B60W 2520/16* (2013.01);
(Continued)

(58) Field of Classification Search
CPC ......... B60W 50/0097; B60W 50/0205; B60W 2552/15; B60W 2552/30; G01C 21/165; G01C 21/28
See application file for complete search history.

(56) References Cited

U.S. PATENT DOCUMENTS 7,477,988 B2 * 1/2009 Dorum ................... G01C 21/26
701/410
9,719,801 B1 * 8/2017 Ferguson ............... G01C 25/00
(Continued)

FOREIGN PATENT DOCUMENTS

CN 103411616 11/2013 ............. G01C 21/26
CN 103 885076 6/2014 ............. G01S 19/47
(Continued)

OTHER PUBLICATIONS

Adasis, "Advancing map-enhanced driver assistance systems", http://adasis,org/, 2002, pp. 1-6.
(Continued)

*Primary Examiner* — Thomas Ingram
(74) *Attorney, Agent, or Firm* — Arriver Software LLC

(57) ABSTRACT

An apparatus including an interface and a processor. The interface may be configured to receive area data and sensor data from a plurality of vehicle sensors. The processor may be configured to extract road characteristics for a location from the area data, predict expected sensor readings at the location for the plurality of sensors based on the road characteristics, calculate dynamic limits for the sensor data in response to the expected sensor readings and determine a plausibility of the sensor data received from the interface when the vehicle reaches the location. The sensor data may be plausible if the sensor data is within the dynamic limits. A confidence level of the sensor data may be adjusted in response to the plausibility of the sensor data.

17 Claims, 9 Drawing Sheets

(51) Int. Cl.
*G01C 21/28* (2006.01)
*G01C 21/16* (2006.01)

(52) U.S. Cl.
CPC ..... *B60W 2520/18* (2013.01); *B60W 2552/15* (2020.02); *B60W 2552/30* (2020.02); *B60W 2555/60* (2020.02)

(56) References Cited

U.S. PATENT DOCUMENTS

| | | | | |
|---|---|---|---|---|
| 10,349,219 | B2* | 7/2019 | Cordova | ................ G01C 21/28 |
| 2005/0149240 | A1 | 7/2005 | Tseng et al. | ..................... 701/45 |
| 2008/0167770 | A1 | 7/2008 | Macdonald et al. | ............ 701/24 |
| 2009/0037062 | A1 | 2/2009 | Lee et al. | ..................... 701/70 |
| 2016/0117841 | A1* | 4/2016 | Fukuman | ................ G06K 9/685 382/103 |
| 2017/0129487 | A1* | 5/2017 | Wulf | ..................... G05D 1/0088 |
| 2017/0211939 | A1* | 7/2017 | Cordova | ............... H04W 4/027 |
| 2017/0297576 | A1* | 10/2017 | Halder | ............ B60W 30/18163 |
| 2018/0052005 | A1* | 2/2018 | Schilling | ................ H04W 4/70 |
| 2018/0259651 | A1* | 9/2018 | Antoni | ..................... G01S 19/20 |

FOREIGN PATENT DOCUMENTS

| | | | |
|---|---|---|---|
| DE | 19945123 | 9/1999 | ............. G01C 21/18 |
| DE | 102007047337 | 5/2008 | ......................... 30/2 |
| DE | 102013224769 | 12/2013 | ............. G01C 21/34 |
| EP | 0870172 A1 | 10/1998 | |
| EP | 2244099 | 1/2009 | ............. G01C 21/00 |
| WO | WO9724582 | 7/1997 | ............. G01C 21/20 |
| WO | WO2017/064790 | 4/2017 | ......................... 21/12 |

OTHER PUBLICATIONS

International Search Report and Written Opinion—PCT/US2019/02110—ISA/EPO—dated Jun. 25, 2019.

* cited by examiner

SENSOR PLAUSIBILITY USING GPS ROAD INFORMATION

FIELD OF THE INVENTION

The invention relates to vehicle sensors generally and, more particularly, to a method and/or apparatus for implementing a sensor plausibility using GPS road information.

BACKGROUND

As automotive systems continue to evolve in complexity and higher Automotive Safety Integrity Levels (ASIL) are desired, the need for these systems to have accurate and trustworthy data sources increases. Many systems in the vehicle require alternative technology and/or redundancy to verify that sensors are working correctly. The additional verifications increase costs and potentially introduce new system noise factors and error states.

Inertial sensor systems include sensing for aX, aY, aZ, Yaw, Pitch, and Roll. Signals from inertial sensors are used by various vehicle control features and functions. If independent and reliable vehicle inclination information were available, a reference for sensor plausibility and higher confidence in the signal quality could be determined.

It would be desirable to implement a sensor plausibility using GPS road information.

SUMMARY

The invention concerns an apparatus comprising an interface and a processor. The interface may be configured to receive area data and sensor data from a plurality of vehicle sensors. The processor may be configured to extract road characteristics for a location from the area data, predict expected sensor readings at the location for the plurality of sensors based on the road characteristics, calculate dynamic limits for the sensor data in response to the expected sensor readings and determine a plausibility of the sensor data received from the interface when the vehicle reaches the location. The sensor data may be plausible if the sensor data is within the dynamic limits. A confidence level of the sensor data may be adjusted in response to the plausibility of the sensor data.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing a sensor plausibility using GPS road information that may (i) determine a confidence level of sensor readings, (ii) determine road characteristics based on map data, (iii) determine dynamic limits for predicted sensor readings, (iv) compare actual sensor readings to predicted sensor readings, (v) predict sensor readings for a particular location using road characteristics and/or (vi) be implemented as one or more integrated circuits.

Figure 1:
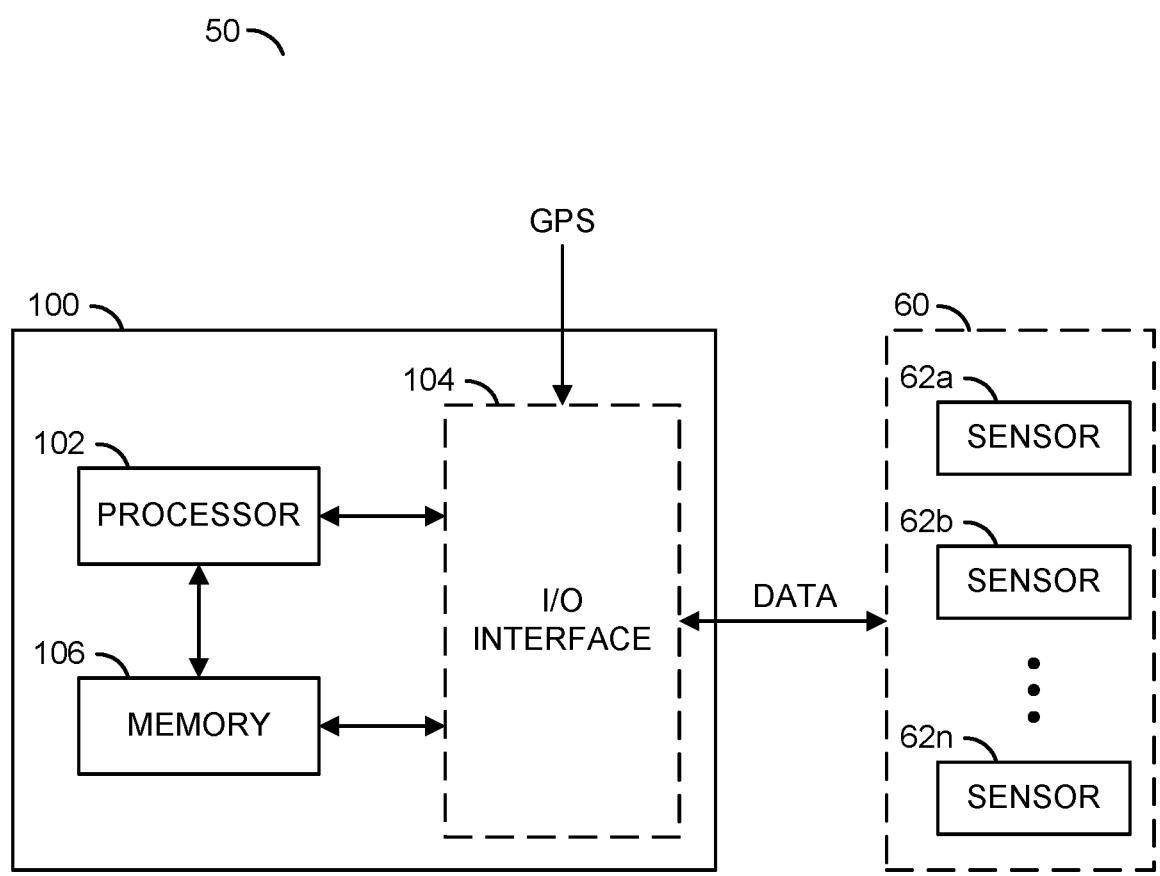
FIG. 1 is a diagram illustrating an example embodiment of the present invention.

Referring to FIG. 1, a block diagram illustrating an example embodiment of the invention is shown. A system 50 is shown. The system 50 may be implemented as part of and/or installed within a vehicle (e.g., a car, a truck, a bicycle, an airplane, etc.). In an example, the system 50 may be implemented as components of a vehicle. In one example, the system 50 may be installed in a vehicle at a time of manufacturing. In another example, the system 50 may be installed as an after-market product in a vehicle. In some embodiments, the system 50 may be a vehicle and/or portion of a vehicle. The implementation of the system 50 may be varied according to the design criteria of a particular implementation.

The system 50 may comprise a block (or circuit) 60 and/or a block (or circuit) 100. The block 60 may implement a sensor block. The circuit 100 may implement an apparatus (e.g., a device, a circuit, a module, an example embodiment of the invention, etc.). The system 50 may comprise other components (not shown). The number, type and/or arrangement of the system 50 may be varied according to the design criteria of a particular implementation.

The apparatus 100 may comprise a block (or circuit) 102, a block (or circuit) 104 and/or a block (or circuit) 106. The circuit 102 may implement a processor. The circuit 104 may implement an input/output interface. The circuit 106 may implement a memory. Details of the processor 102, the I/O interface 104 and/or the memory 106 may be described in greater detail in association with FIG. 2. The apparatus 100 may comprise other components (not shown). The number, type and/or arrangement of the components of the apparatus 100 may be varied according to the design criteria of a particular implementation.

The sensor block 60 is shown sending/receiving a signal (e.g., DATA). In an example, the signal DATA may comprise data exchanged between the sensor block 60 and the apparatus 100. The signal DATA may comprise data readings from the sensors 62a-62n. In some embodiments, the apparatus 100 may be configured to send information to the sensors 62a-62n via the signal DATA (e.g., calibration data).

The sensor block 60 may comprise a number of blocks (or circuits) 62a-62n. The blocks 62a-62n may each comprise a sensor. The sensors 62a-62n may be configured to detect, read, sense, and/or receive input. In some embodiments, each of the sensors 62a-62n may be configured to detect a different type of input. In some embodiments, each of the sensors 62a-62n may be the same type of sensor. In one example, the sensors 62a-62n may comprise video cameras (e.g., capable of recording video and/or audio). In another example, the sensors 62a-62n may comprise infrared (IR) sensors (e.g., capable of detecting various wavelengths of light). In some embodiments, the sensors 62a-62n may comprise vehicle sensors (e.g., speed sensors, vibration sensors, triaxial sensors, magnetometers, temperature sensors, gyroscopes, LIDAR, radar, accelerometers, inertial sensors, etc.). For example, the sensors 62a-62n may be configured to detect acceleration in an X direction (e.g., aX), acceleration in a Y direction (e.g., aY), acceleration in a Z direction (e.g., aZ), a yaw, a pitch and/or a roll. The implementation, type and/or arrangement of the sensors 62a-62n may be varied according to the design criteria of a particular implementation.

The I/O interface 104 may be configured to send/receive input/output. In the example shown, the I/O interface 104 may send/receive the signal DATA. In some embodiments, the sensors 62a-62n may be vehicle sensors and the I/O interface 104 may provide the module 100 access to the sensors 62a-62n and/or sensor data. The I/O interface 104 may receive a signal (e.g., GPS). In one example, the signal GPS may be received from one or more GNSS satellites. In another example, the signal GPS may be received from an Advanced Driver Assistance Systems (ADAS) provider. In yet another example, the signal GPS may be generated locally (e.g from another component of the vehicle 50).

The signal GPS may provide area data. The area data may provide information used to determine road characteristics. In some embodiments, the area data may comprise location co-ordinates (e.g., longitude and latitude). Generally, the area data may comprise more information than location co-ordinates. The road characteristics may comprise ADAS data (e.g., ADAS horizon) for various locations. The road characteristics may comprise altitude, road curvature data, road banking data, landmark information (e.g., information about nearby road signs and/or street lights), sensor readings from previous vehicles that have driven at that location, lane-specific information, etc. Generally, the road characteristics may comprise data usable to predict potential readings from the sensors 62a-62n for a particular location.

Figure 2:
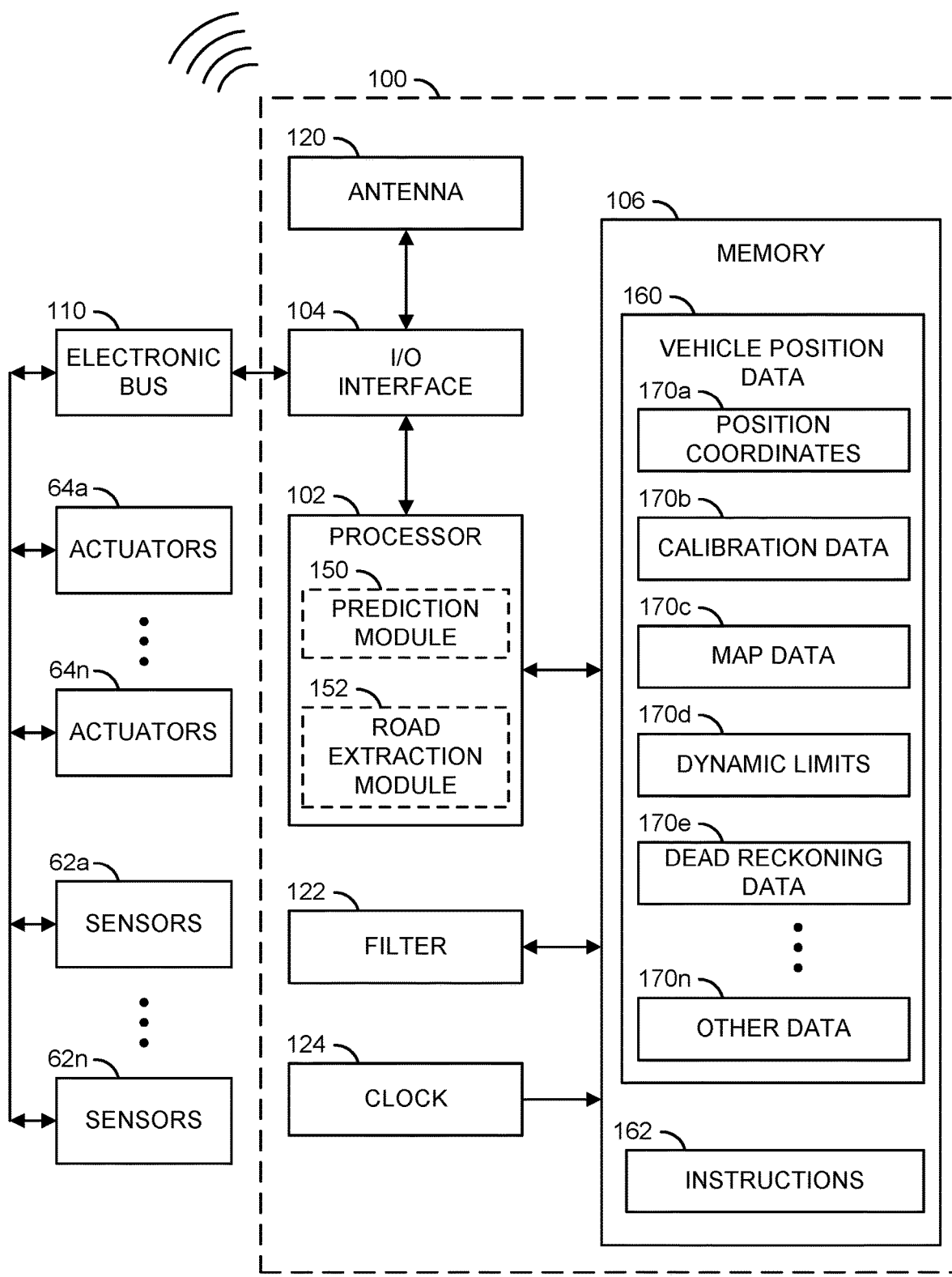
FIG. 2 is a diagram illustrating a module configured to determine sensor plausibility using GPS road information.

Referring to FIG. 2, a diagram illustrating a module configured to determine sensor plausibility using GPS road information is shown. The module 100 may transmit/receive the signal DATA and/or the signal GPS. The module 100 may send/receive other signals (not shown). The number and/or type of signals sent and/or received by the module 100 may be varied according to the design criteria of a particular implementation.

The module 100 may be connected to a block (or circuit) 110. The circuit 110 may implement an electronic bus. The electronic bus 110 may be configured to transfer data between the module 100 and the sensors 62a-62n and/or actuators 64a-64n. In some embodiments, the electronic bus 110 may be implemented as a vehicle CAN bus. The electronic bus 110 may be implemented as an electronic wired network and/or a wireless network. Generally, the electronic bus 110 may connect one or more components of the vehicle 50 to enable a sharing of information in the form of digital signals (e.g., a serial bus, an electronic bus connected by wiring and/or interfaces, a wireless interface, etc.).

The module 100 generally comprises the processor 102, the I/O interface 104, the memory 106, a block (or circuit) 120, a block (or circuit) 122 and/or a block (or circuit) 124. The circuit 120 may implement an antenna. The circuit 122 may implement a filter. The circuit 124 may implement a clock. Other blocks (not shown) may be implemented (e.g., I/O ports, power connectors, interfaces, etc.). The number and/or types of circuits implemented by the module 100 may be varied according to the design criteria of a particular implementation.

The antenna 120 may be implemented as a dual band antenna capable of connecting to both a cellular network (e.g., to provide a potential connection option to base stations), a GNSS network (e.g., communication satellites) and/or a Wi-Fi network. In another example, the antenna 120 may be implemented as two or more antennas. For example, one antenna may be specifically designed to connect to the base station(s), while another antenna may be implemented to connect to the GNSS network satellites. The antenna 120 may be implemented as discrete antenna modules and/or a dual band antenna module. In some embodiments, the antenna 120 may be implemented as an off-board circuit (e.g., a component that is not part of the module 100). For example, the antenna 120 may send/receive data to/from the module 100 via the electronic bus 110. The implementation of the antenna 120 may be varied according to the design criteria of a particular implementation.

In some embodiments, the antenna 120 may be implemented as a transceiver configured to communicate (e.g., send and/or receive) data (e.g., radio signals). The transceiver 120 may receive data from the processor 102 to communicate with external devices (e.g., other of the modules 100a-100n). The transceiver 120 may receive communications from external devices (e.g., other of the modules 100a-100n) and transmit the communication signals to the processor 102. The transceiver 102 may be configured to communicate a Basic Safety Message (BSM) protocol and/or data outside the BSM protocol. The transceiver 120 may be configured to be compatible with one or more communications protocols (e.g., a Wi-Fi transceiver configured to perform dedicated short-range communication (DSRC), vehicle to vehicle (V2V) and/or vehicle to infrastructure (V2I) communication). The implementation of the transceiver 120 may be varied according to the design criteria of a particular implementation.

The processor 102 may be implemented as a microcontroller. The processor 124 may comprise a block (or circuit) 150 and/or a block (or circuit) 152. The circuit 150 may implement a prediction module and/or chipset. The circuit 152 may implement a road extraction module. The processor 102 may comprise other components (not shown). In some embodiments, the processor 102 may be a combined (e.g., integrated) chipset implementing processing functionality, the prediction chipset 152 and/or the road extraction chipset 154. In some embodiments, the processor 102 may be comprised of a number of separate circuits (e.g., the microcontroller, the prediction chipset 150 and/or the road extraction chipset 152). The prediction module 150 and/or the road extraction module 152 may each be an optional component of the processor 102. In an example, an off-board circuit (e.g., a component that is not part of the module 100) may perform the functions of the prediction chipset 150 and send information to the module 100 (e.g., via the bus 110). In another example, an off-board circuit (e.g., a component that is not part of the module 100 such as a distributed and/or scalable computing service) may perform functions for determining the prediction data and/or the road characteristics and send information to the module 100 (e.g., via the bus 110). The design of the processor 102 and/or the functionality of various components of the processor 102 may be varied according to the design criteria of a particular implementation. The processor 102 is shown sending data to and/or receiving data from the I/O interface 104 and/or the memory 106.

The memory 106 may comprise a block (or circuit) 160 and a block (or circuit) 162. The block 160 may store vehicle position data and/or sensor data. The block 162 may store computer readable instructions (e.g., instructions readable by the processor 102). The vehicle position data 160 may store various data sets 170a-170n. For example, the data sets 170a-170n may comprise position coordinates 170a, calibration data 170b, map data 170c, dynamic limits 170d, dead reckoning data 170e and/or other data 170n.

The position coordinates 170a may store location information data calculated and/or received by the module 100 from the GNSS satellites. The GNSS satellites may provide data from which a particular resolution of location information positional accuracy may be calculated from the signal GPS. In some embodiments, the position coordinates 170a may not provide sufficient positional accuracy for particular applications (e.g., lane detection, autonomous driving, etc.). In some embodiments, the position coordinates 170a may be calculated by the filter 122 and/or a component external to the module 100.

The calibration data 170b may comprise parameters (e.g., coefficients) used to transform data received from the sensors 62a-62n and/or presented to the actuators 64a-64n. The calibration data 170b may provide many sets of coefficients (e.g., one set of coefficients for each of the sensors 62a-62n and/or the actuators 64a-64n). The calibration data 170b may be updatable. For example, the calibration data 170b may store current values as coefficients for the sensors 62a-62n and/or the actuators 64a-64n and, as the data from the sensors 62a-62n and/or the actuators 64a-64n drifts, the module 100 may update the calibration data 170b in order to maintain accuracy. The format of the calibration data 170b may vary based on the design criteria of a particular implementation.

The map data 170c may be used to store the road characteristics extracted from the area data (e.g., the signal GPS). In an example, the road extraction module 152 may be configured to extract the road characteristics from the ADAS information received using the signal GPS and the road characteristics may be stored as the map data 170c. The map data 170c may be used to determine the plausibility of the readings from the sensors 62a-62n.

The dynamic limits 170d may comprise ranges of potential data readings for each of the sensors 62a-62n. The prediction module 150 may be configured to analyze the road characteristics of the map data 170c. Based on the analysis of the road characteristics, the prediction module 150 may determine a range of potential and/or likely readings from the sensors 62a-62n. For example, if the road characteristics of a particular road indicate a slight bank, the prediction module 150 may predict a range of readings from the inertial sensors corresponding to the slight bank (e.g., a roll value corresponding to the steepness of the bank). The range of readings may be stored as the dynamic limits 170d.

In some embodiments, the prediction module 150 may analyze the vehicle attributes (e.g., size, shape, aerodynamics, maneuverability, etc.) to determine the dynamic limits 170d specific to the vehicle 50. When the vehicle 50 reaches the actual location of the particular road, the processor 102 may analyze the readings from the sensors 62a-62n. For example, the processor 102 may compare the actual readings from the inertial sensors to the dynamic limits 170d. If the readings from the sensors 62a-62n are close to the dynamic limits 170d (e.g., within the range of likely sensor values), the readings from the sensors 62a-62n may be considered plausible (e.g., the sensor data may be reliable).

The dead reckoning data 170e may be used to store past and/or present information to determine positions traveled by the vehicle 50. For example, the dead reckoning data 170e may store a previously determined position of the vehicle 50 (e.g., estimated speed, estimated time of travel, estimated location, etc.). The previously determined position may be used to help determine a current position of the vehicle 50. In some embodiments, the dead reckoning data 170e may be determined based on data from the sensors 62a-62n of the vehicle 50 (e.g., an on-board gyroscope and/or wheel click messages). The implementation and/or the information stored to determine the dead reckoning data 170e may be varied according to the design criteria of a particular implementation.

Various other types of data (e.g., the other data 170n) may be stored as part of the vehicle position data 160. For example, the other data 170n may store trend information for the calibration data 170b. For example, the other data 170n may store past data values of the calibration data 170b and/or current data values of the calibration data 170b. The past and current data values of the calibration data 170b may be compared to determine trends used to extrapolate and/or predict potential future values for the calibration data 170b. For example, the trend information may be used to continue to refine the calibration data 170b when the module 100 is operating in a pure dead reckoning mode (e.g., the location information fails the quality check). In some embodiments, the other data 170n may store various coordinate systems determined using a procrusting procedure and/or multi-dimensional scaling operations. In some embodiments, the other data 170n may store time stamp information.

The processor 102 may be configured to execute stored computer readable instructions (e.g., the instructions 162 stored in the memory 106). The processor 102 may perform one or more steps based on the stored instructions 162. In an example, the processor 102 may predict values for the sensors 62a-62n. In another example, one of the steps of the instructions 162 may be executed/performed by the processor 102 and may determine and/or extract the road characteristics from the signal GPS. In yet another example, one of the steps of the instructions 162 may be executed/performed by the processor 102 and may compare and/or determine the dynamic limits 170d. In still another example, one of the steps of the instructions 162 may be executed/performed by the processor 102 and may adjust a confidence level of sensor data. The instructions executed and/or the order of the instructions 162 performed by the processor 102 may be varied according to the design criteria of a particular implementation.

The communication port 104 may allow the module 100 to communicate with external devices such as the sensors 62a-62n and/or the actuators 64a-64n. For example, the module 100 is shown connected to the external electronic bus 110. The communication port 104 may allow the module 100 to receive information from the sensors 62a-62n of the vehicle 50 (e.g., an on-board gyroscope data, wheel click messages, LIDAR, etc.). For example, information from the module 100 may be communicated to an infotainment device for display to a driver. In another example, a wireless connection (e.g., Wi-Fi, Bluetooth, cellular, etc.) to a portable computing device (e.g., a smartphone, a tablet computer, a notebook computer, a smart watch, etc.) may allow information from the module 100 to be displayed to a user.

The filter 122 may be configured to perform a linear quadratic estimation. For example, the filter 122 may implement a Kalman filter. Generally, the filter 122 may operate recursively on input data to produce a statistically optimal estimate. For example, the filter 122 may be used to calculate the position coordinates 170a and/or estimate the accuracy of the position coordinates 170a. In some embodiments, the filter 122 may be implemented as a separate module. In some embodiments, the filter 122 may be implemented as part of the memory 106 (e.g., the stored instructions 162). The implementation of the filter 122 may be varied according to the design criteria of a particular implementation.

The clock 124 may be configured to determine and/or track a time. The time determined by the clock 124 may be stored as a time stamp (e.g., part of the other data 170n). In some embodiments, the time stamp may be used to correlate data from the sensors 62a-62n to a particular location when the data was received from the sensors 62a-62n (e.g., to determine the plausibility of the readings from the sensors 62a-62n at a later time).

The module 100 may be configured as a chipset, a system on chip (SoC) and/or a discrete device. For example, the module 100 may be implemented as an electronic control unit (ECU). In some embodiments, the module 100 may be configured to calculate a position, velocity and time (PVT) solution, a relative positioning solution and/or a dead reckoning solution. For example, PVT may be considered a bare minimum output for navigation. In some embodiments, the module 100 may calculate a PVT solution and/or the dead reckoning solution. In some embodiments, the module 100 may be configured to receive a data stream that provides the PVT solution and may not determine the dead reckoning solution (e.g., the module 100 receives PVT data from an off-board component, determines the calibration data 170b and sends the calibration data 170b to an off-board component to determine the dead reckoning solution). In some embodiments, the module 100 may be configured to receive a data stream that provides the PVT solution and be configured to calculate the dead reckoning solution. The module 100 may be configured to supplement the PVT solution with the cooperative positioning solution.

In some embodiments, the module 100 may use an external processor (e.g., an off-board processor) to perform the calculations and/or perform operations. In one example, the external processor may be implemented as a distributed computing service configured to scale and/or provision resources on demand (e.g., cloud computing). For example, the module 100 may transmit data to the cloud computing service and one or more processors of the cloud computing service may perform the calculations and/or perform operations. The module 100 may receive the calculations from the cloud computing service and store the data in the memory 106. In some embodiments, the instructions 162 may be stored on an external memory. The implementation of using the external components to supplement a capability of the module 100 may be varied according to the design criteria of a particular implementation.

Generally, the module 100 receives and/or determines a PVT solution, a dead reckoning solution and/or a cooperative positioning solution (e.g., CoP). The module 100 may be configured to separate and/or extract the data component of the dead reckoning data 170e, the data component of the PVT solution (e.g., the location data) and/or the relative position data. In some embodiments, the instructions 162 may be executed by the processor 102 to provide responses to requests from other components of the vehicle 50. For example, a brake system of the vehicle 50 (e.g., one of the actuators 64a-64n) may request information from the module 100 before performing a particular response and/or corrective measure (e.g., to slow down).

The sensors 62a-62n may be configured to capture information from the environment surrounding the vehicle 50. The sensors 62a-62n may be vehicle sensors (e.g., speedometer, fluid sensors, temperature sensors, etc.). In some embodiments, data from the sensors 62a-62n may be used to determine the dead reckoning data 170e. In one example, the sensors 62a-62n may be various types of sensors configured to determine vehicle movement (e.g., magnetometers, accelerometers, wheel click sensors, vehicle speed sensors, gyroscopes, etc.). In another example, data from the sensors 62a-62n may be used to determine distances and/or directions traveled from a reference point. The types of sensors 62a-62n implemented may be varied according to the design criteria of a particular implementation.

The actuators 64a-64n may be components of the vehicle 50 configured to cause an action, move and/or control an aspect of the vehicle 50. For example, the actuators 64a-64n may be one or more of a braking system, a steering system, a lighting system, windshield wipers, a heating/cooling system, etc. In some embodiments, the actuators 64a-64n may be configured to respond to information received from the module 100 and/or the sensors 62a-62n. For example, if one of the actuators 64a-64n is a steering system, the steering system may receive information from the module 100 indicating that a collision with a nearby vehicle is likely and the steering system may respond by causing the vehicle 50 to change direction (e.g., a corrective measure). The types of actuators 64a-64n implemented may be varied according to the design criteria of a particular implementation.

In some embodiments, the sensors 62a-62n and/or the actuators 64a-64n may be implemented to enable autonomous driving of the vehicle 50. For example, the sensors 62a-62n may receive and/or capture input to provide information about the nearby environment. The information captured by the sensors 62a-62n may be used by components of the vehicle 50 and/or the module 100 to perform calculations and/or make decisions. The calculations and/or decisions may determine what actions the vehicle 50 should take. The actions that the vehicle 50 should take may be converted into signals readable by the actuators 64a-64n. The actuators 64a-64n may cause the vehicle 50 to move and/or respond to the environment. For example, the module 100 may present an output that provides a relative position of the vehicle 50 to other vehicles. In some embodiments, the module 100 may determine a plausibility of the accuracy of the readings of the sensors 62a-62n to increase an ASIL classification of the vehicle 50. Other components may be configured to use the data provided by the module 100 to make appropriate decisions for autonomous driving.

Figure 3:
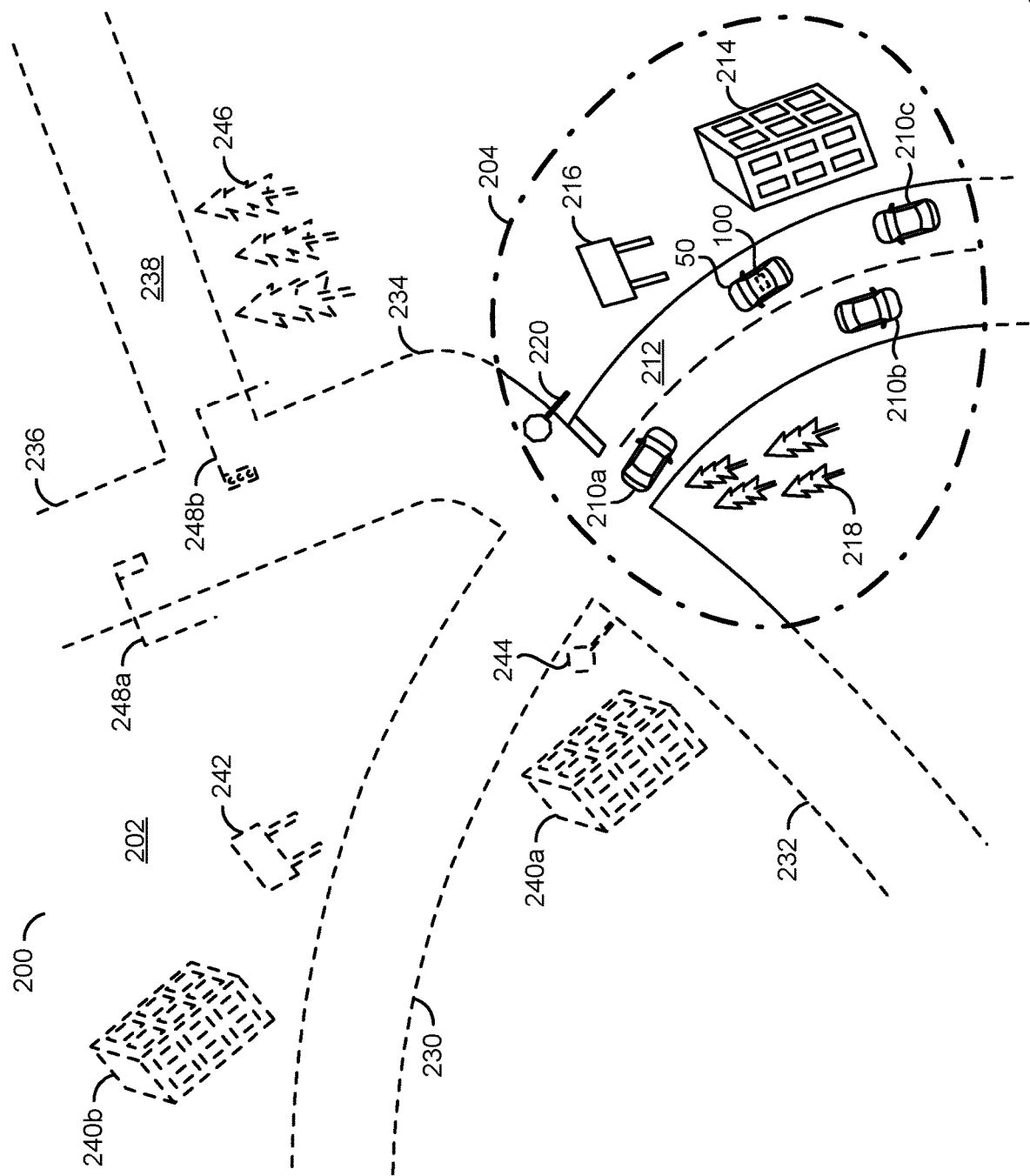
FIG. 3 is a diagram illustrating an example visualization of sensor readings and area data.

Referring to FIG. 3, a diagram illustrating an example visualization 200 of sensor readings and area data is shown. The visualization 200 may represent the map data 170c and readings from the sensors 62a-62n. The visualization 200 may represent a conceptual comparison of the predicted expected sensor readings and actual sensor data from the sensors 62a-62n.

In the example shown, the visualization 200 may comprise a region 202 and a region 204. The region 202 may represent the map data 170c. For example, the region 202 may be outside of the usable and/or visible range of the sensors 62a-62n. The region 204 may represent an area near the vehicle 50. For example, the region 204 may be within the range of the sensors 62a-62n of the vehicle 50. The region 202 may be larger than the region 204. For example, the size of the region 202 may be determined based on an amount of storage capacity reserved for the map data 170c.

The size of the region 204 may be limited to a usable range of one or more of the sensors 62a-62n.

Generally, the module 100 may have less information about the region 202 than the region 204. The module 100 may have some information about roads and/or infrastructure in the region 202. The region 202 may be determined from the signal GPS. In some embodiments, information about vehicles and/or current conditions (e.g., weather, traffic, construction, etc.) for the region 202 may not be available in the map data 170c. In some embodiments, nearby vehicles and/or cloud infrastructure may continually update the map data 170c to provide details about current conditions for the region 202. The road extraction module 152 may be configured to determine the road characteristics for the region 202. The prediction module 150 may be configured to perform predictions for the data readings of the sensors 62a-62n (e.g., stored as the dynamic limits 170d).

The module 100 may be configured to determine detailed information about the region 204 based on the readings from the sensors 62a-62n. The vehicle 50 implementing the module 100 is shown within the region 204. In the example shown, vehicles 210a-210c and the vehicle 50 are shown on a road 212 within the region 204. In the example shown, the sensors 62a-62n may detect a building 214, a billboard 216, a group of trees 218 and/or a stop sign 220.

In addition to the objects in the region 204, the module 100 may be configured to determine sensor data corresponding to the road characteristics and/or driving conditions. For example, the portion of the road 212 corresponding to the location of the vehicle 50 may have a curve. The readings from the sensors 62a-62n may indicate a change in acceleration in an X direction (e.g., aX) and/or a change in yaw. In an example, if the road 212 has an incline/decline, the readings from the sensors 62a-62n may determine a change in pitch. The processor 102 may perform a comparison between the dynamic limits 170d for the location of the region 204 and the actual sensor data from the sensors 62a-62n while the vehicle 50 is in the location of the region 204.

In the example shown, a road 230, a road 232, a curve 234, a road 236 and/or a road 238 are shown in the region 202. Some information about infrastructure and/or landmarks may be provided in the ADAS horizon data of the signal GPS. In the example shown, buildings 240a-240b, a billboard 242, a sign 244, a group of trees 246 and/or street lights 248a-248b are shown.

The prediction module 150 may be configured to predict expected sensor readings and/or determine the dynamic limits 170d for the region 202 based on the map data 170c. The road characteristics may be attributes of the road. In an example, the road extraction module 152 may extract the road characteristics for the road 230, the road 232, the curve 234 and/or the road 236. Based on the road characteristics (e.g., the radius of the curve 234, a bank of the roadway through the curve 234, an elevation of the curve 234, etc.), the prediction module 150 may determine a range of likely readings for the sensors 62a-62n. For example, based on a radius of the curve 234, the prediction module 150 may determine an amount of expected yaw. In another example, based on an angle of the bank of the curve 234, the prediction module 150 may determine an amount of expected roll. The range of likely values for the sensors 62a-62n corresponding to the curve 234 may be stored as the dynamic limits 170d. The dynamic limits 170d may be unique to a specific vehicle and/or vehicle model (e.g., based on the vehicle attributes).

In some embodiments, the prediction module 150 may determine the dynamic limits 170d corresponding to distances from known landmarks. In one example, the prediction module 150 may determine a range of likely values (e.g., based on possible drifting by the vehicle 50 within the lane) for distance readings by the sensors 62a-62n for the building 240b. When the vehicle 50 is driving on the road 230, the sensors 62a-62n may determine an actual distance of the vehicle 50 from the building 240b. The processor 102 may determine a plausibility of the actual readings from the sensors 62a-62n by comparing the actual readings to the dynamic limits 170d.

As the vehicle 50 moves, the location of the region 204 may also move and/or be modified. The location of the region 204 may correspond to where the vehicle 50 is located (e.g., where the sensors 62a-62n are acquiring data). The size and/or shape of the region 204 may change as the vehicle 50 moves. For example, various sensors 62a-62n may be blocked and/or have a decreased/increased range based on the environment (e.g., the building 214 may block a field of view of the camera).

In some embodiments, the module 100 may contribute to the information about the road characteristics. For example, the I/O interface 104 and/or the antenna 120 may be configured to communicate with an ADAS service (e.g., a third-party provider, a cloud server infrastructure, etc.). As the module 100 acquires data from the sensors 62a-62n, the module 100 may upload the sensor data to the ADAS service (e.g., to continually and/or periodically improve, confirm and/or update information provided in the signal GPS). For example, if the group of trees 246 is removed, and the module 100 detects that the trees 246 are no longer present, the module 100 may update the ADAS service to no longer provide information about the trees 246.

Figure 4:
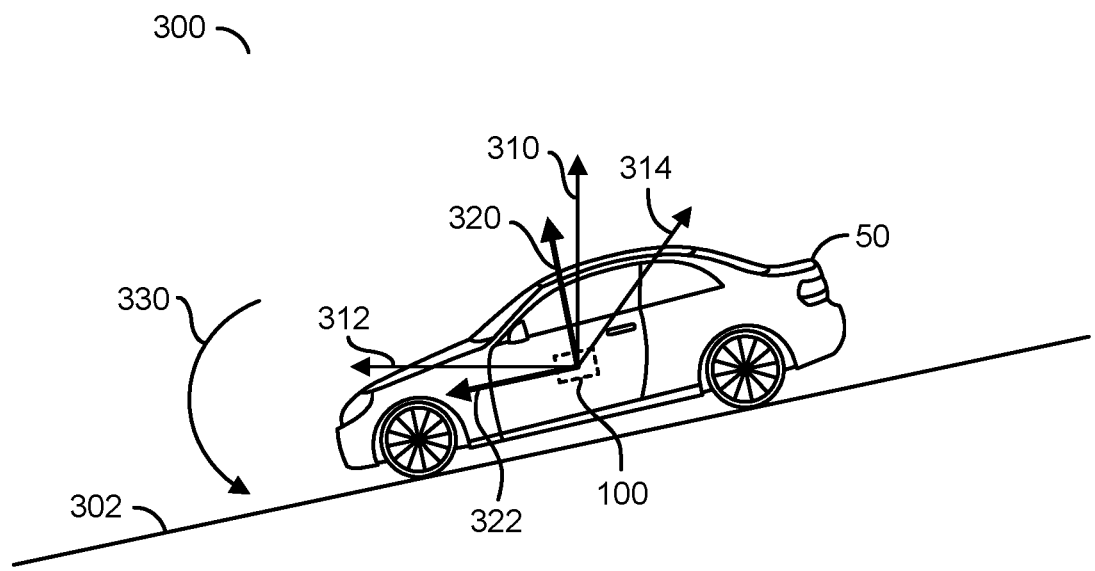
FIG. 4 is a diagram illustrating sensor readings in a decline scenario.

Referring to FIG. 4, a diagram illustrating sensor readings in a decline scenario 300 is shown. The vehicle 50 is shown driving on the road 302. The road 302 is shown having a decline angle road characteristic. The module 100 may acquire sensor data from the sensors 62a-62n.

An arrow 310, an arrow 312 and an arrow 314 are shown. The arrow 310 may represent a Z axis. The arrow 312 may represent an X axis. The arrow 314 may represent a Y axis. The module 100 may use the sensor data from the sensors 62a-62n to determine an acceleration in the X direction aX, an acceleration in the Y direction aY and/or an acceleration in the Z direction aZ. An arrow 320 and/or an arrow 322 are shown. The arrow 320 may represent the acceleration aZ. The arrow 322 may represent the acceleration aX. A curved arrow 330 is shown. The arrow 330 may represent a pitch of the vehicle 50.

In the decline scenario 300, the module 100 may determine that there is a negative acceleration in the X direction (e.g., −aX), a negative acceleration in the Z direction (e.g., −aZ) and a negative pitch value (e.g., counter-clockwise pitch). The road extraction module 152 may extract the road characteristics for the road 302 from the map data 170c. The prediction module 150 may generate the dynamic limits 170d for the sensor data corresponding to the road 302 based on the road characteristics. For example, the road characteristics of the map data 170c may indicate a decline in the road 302, which may correspond to a negative pitch value.

The processor 102 may compare the actual sensor readings while the vehicle 50 is traveling on the road 302 to the dynamic limits 170d corresponding to the road 302 predicted by the prediction module 150. If the actual sensor readings are within the range of the dynamic limits 170d, then the processor 102 may determine that the sensor readings are plausible. If the actual sensor readings are not within the range of the dynamic limits 170d then the processor 102 may determine that the sensor readings are not plausible.

For example, if the actual sensor readings determined by the sensors 62a-62n indicate that the vehicle 50 has a positive acceleration in the X direction (e.g., +aX), then the sensor readings may not be plausible. The sensors 62a-62n may need re-calibration and/or repair. The sensor data may not be reliable and the sensor data may be discarded. In another example, the actual sensor readings may indicate that the vehicle 50 has a negative acceleration in the X direction (e.g., −aX), but the amount of acceleration is more than expected or not as much as expected (e.g., beyond the dynamic limits 170d). Similarly, the sensors 62a-62n may need re-calibration and/or the sensor data may be discarded.

Figure 5:
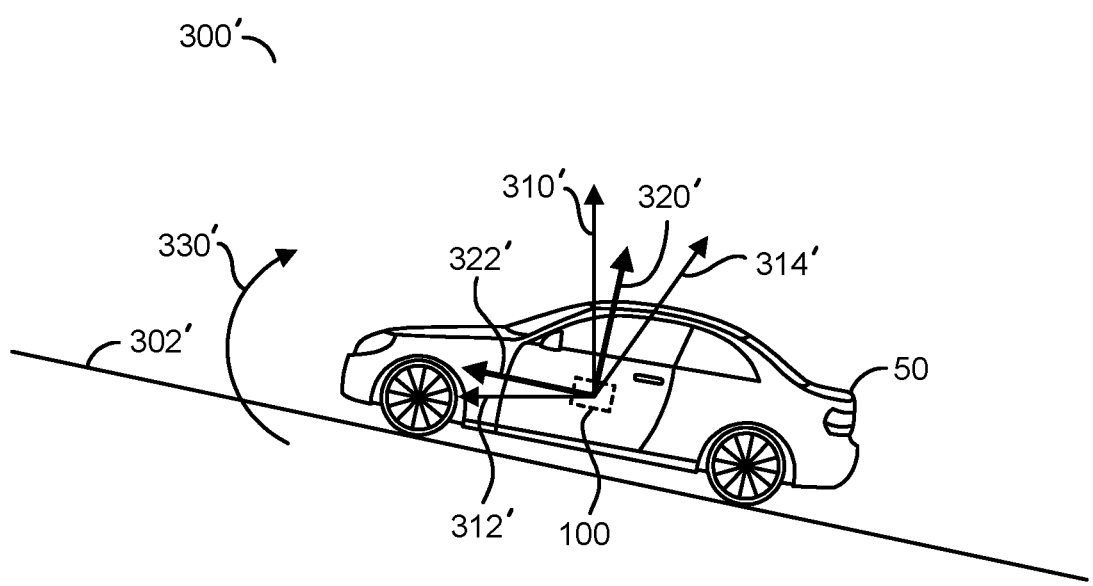
FIG. 5 is a diagram illustrating sensor readings in an incline scenario.

Referring to FIG. 5, a diagram illustrating sensor readings in an incline scenario 300' is shown. The vehicle 50 is shown driving on the road 302'. The road 302' is shown having an incline angle road characteristic. The module 100 may acquire sensor data from the sensors 62a-62n.

An arrow 310', an arrow 312' and an arrow 314' are shown. The arrow 310' may represent a Z axis. The arrow 312' may represent an X axis. The arrow 314' may represent a Y axis. The module 100 may use the sensor data from the sensors 62a-62n to determine an acceleration in the X direction aX, an acceleration in the Y direction aY and/or an acceleration in the Z direction aZ. An arrow 320' and/or an arrow 322' are shown. The arrow 320' may represent the acceleration aZ. The arrow 322' may represent the acceleration aX. A curved arrow 330' is shown. The arrow 330' may represent a pitch of the vehicle 50.

In the incline scenario 300', the module 100 may determine that there is a positive acceleration in the X direction (e.g., +aX), a positive acceleration in the Z direction (e.g., +aZ) and a positive pitch value (e.g., clockwise pitch). The road extraction module 152 may extract the road characteristics for the road 302' from the map data 170c. The prediction module 150 may generate the dynamic limits 170d for the sensor data corresponding to the road 302' based on the road characteristics. For example, the road characteristics of the map data 170c may indicate an incline in the road 302' which may correspond to a positive pitch value.

The processor 102 may compare the actual sensor readings while the vehicle 50 is traveling on the road 302' to the dynamic limits 170d corresponding to the road 302' predicted by the prediction module 150. If the actual sensor readings are within the range of the dynamic limits 170d, then the processor 102 may determine that the sensor readings are plausible. If the actual sensor readings are not within the range of the dynamic limits 170d then the processor 102 may determine that the sensor readings are not plausible.

For example, if the actual sensor readings determined by the sensors 62a-62n indicate that the vehicle 50 has a positive acceleration in the X direction (e.g., +aX), then the sensor readings may be plausible. The sensors 62a-62n may be considered reliable. The sensor data may be considered a confirmed source of reliable data and the confidence level (e.g., ASIL) for the vehicle 50 may be increased. In another example, the actual sensor readings may indicate that the vehicle 50 has a positive acceleration in the X direction (e.g., +aX) and the +aX value is within the dynamic limits 170d but the acceleration in the Z direction+aZ is more than expected or not as much as expected (e.g., beyond the dynamic limits 170d). Unless all of the sensor readings are within the dynamic limits 170d, the sensor data may not be considered reliable.

Figure 6:
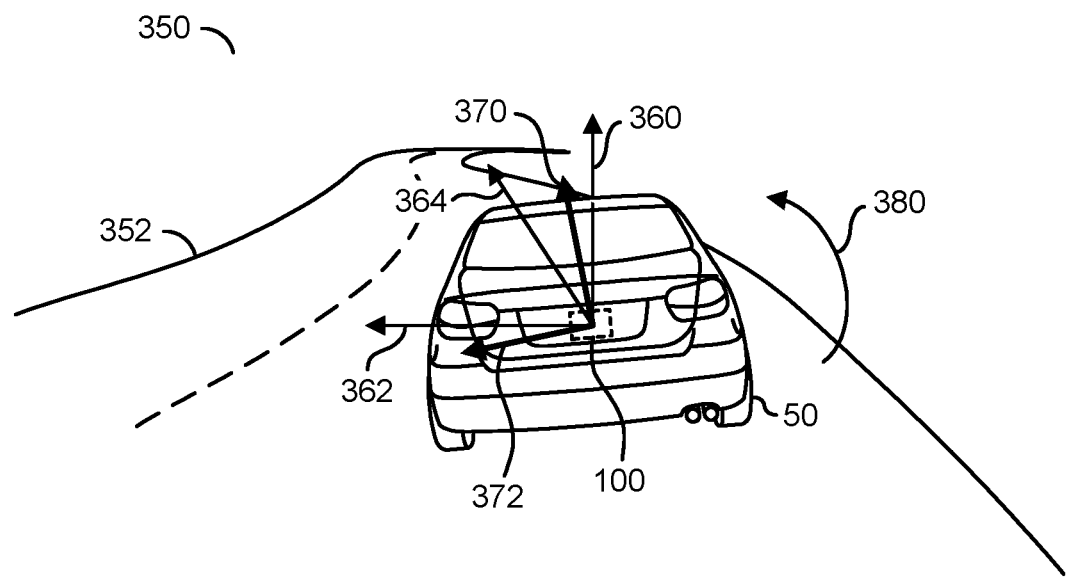
FIG. 6 is a diagram illustrating sensor readings in a bank scenario.

Referring to FIG. 6, a diagram illustrating sensor readings in a bank scenario 350 is shown. The vehicle 50 is shown driving on the road 352. The road 352 is shown having a banking (e.g., inclining from left to right) road characteristic. For example, the bank of the road 352 may cause the passenger side of the vehicle 50 to be slightly higher than the driver side of the vehicle 50. The module 100 may acquire sensor data from the sensors 62a-62n.

An arrow 360, an arrow 362 and an arrow 364 are shown. The arrow 360 may represent a Y axis. The arrow 362 may represent an X axis. The arrow 364 may represent a Z axis. The module 100 may use the sensor data from the sensors 62a-62n to determine an acceleration in the X direction aX, an acceleration in the Y direction aY and/or an acceleration in the Z direction aZ. An arrow 370 and/or an arrow 372 are shown. The arrow 370 may represent the acceleration aY. The arrow 372 may represent the acceleration aX. A curved arrow 380 is shown. The arrow 380 may represent a roll of the vehicle 50.

In the bank scenario 350, the module 100 may determine that there is a positive acceleration in the X direction (e.g., +aX), a positive acceleration in the Y direction (e.g., +aY) and a negative roll value (e.g., counter-clockwise roll). The road extraction module 152 may extract the road characteristics for the road 352 from the map data 170c. The prediction module 150 may generate the dynamic limits 170d for the sensor data corresponding to the road 352 based on the road characteristics. For example, the road characteristics from the map data 170c may indicate a bank in the road 352.

The processor 102 may compare the actual sensor readings while the vehicle 50 is traveling on the road 350 to the dynamic limits 170d corresponding to the road 350 predicted by the prediction module 150. If the actual sensor readings are within the range of the dynamic limits 170d, then the processor 102 may determine that the sensor readings are plausible. If the actual sensor readings are not within the range of the dynamic limits 170d then the processor 102 may determine that the sensor readings are not plausible.

For example, if the actual sensor readings determined by the sensors 62a-62n indicate that the vehicle 50 has a positive roll value (e.g., a clockwise roll detected), then the sensor readings may not be plausible. The sensors 62a-62n may need re-calibration and/or repair. The sensor data may not be reliable and the sensor data may be discarded. In another example, the actual sensor readings may indicate that the vehicle 50 has a negative roll value, but the amount of roll is more than expected or not as much as expected (e.g., beyond the dynamic limits 170d). Similarly, the sensors 62a-62n may need re-calibration and/or the sensor data may be discarded.

Figure 7:
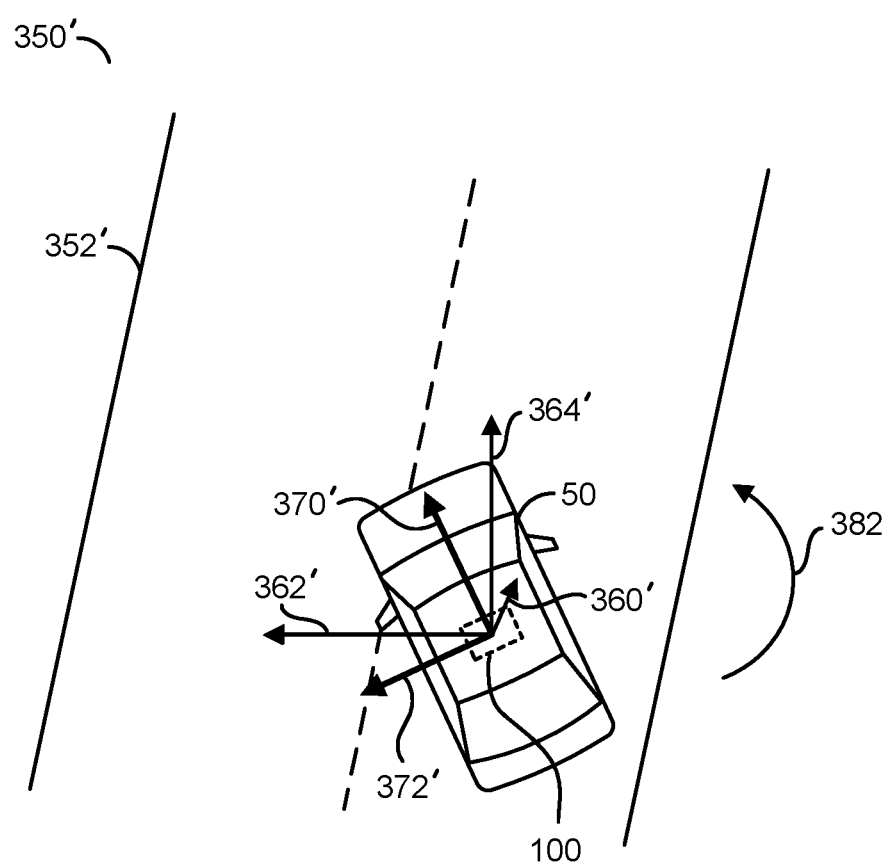
FIG. 7 is a diagram illustrating sensor readings in a skid scenario.

Referring to FIG. 7, a diagram illustrating sensor readings in a skid scenario 350' is shown. The vehicle 50 is shown driving on the road 352'. The road 352 is shown having a slight angle, but a relatively straight path. The vehicle 50 is shown at an angle and driving in a direction out of the boundaries of the right-hand lane. For example, the vehicle 50 may be in a skid and the driver of the vehicle 50 may not have control of the vehicle 50. In an example, the vehicle 50 may have hit an ice patch and lost traction. In another example, the vehicle 50 may be hydroplaning resulting in a loss of control. The module 100 may acquire sensor data from the sensors 62a-62n.

An arrow 360', an arrow 362' and an arrow 364' are shown. The arrow 360' may represent a Y axis. The arrow 362' may represent an X axis. The arrow 364' may represent a Z axis. The module 100 may use the sensor data from the sensors 62a-62n to determine an acceleration in the X direction aX, an acceleration in the Y direction aY and/or an acceleration in the Z direction aZ. An arrow 370' and/or an arrow 372' are shown. The arrow 370' may represent the acceleration aZ. The arrow 372' may represent the acceleration aX. A curved arrow 382 is shown. The arrow 382 may represent a yaw of the vehicle 50.

In the skid scenario 350, the module 100 may determine that there is a negative acceleration in the X direction (e.g., −aX), a negative acceleration in the Z direction (e.g., −aZ) and a negative yaw value (e.g., counter-clockwise yaw). The road extraction module 152 may extract the road characteristics for the road 352 from the map data 170c. The prediction module 150 may generate the dynamic limits 170d for the sensor data corresponding to the road 352' based on the road characteristics. For example, the road characteristics from the map data 170c may indicate that no curve is present in the road 352'.

The processor 102 may compare the actual sensor readings while the vehicle 50 is traveling on the road 350' to the dynamic limits 170d corresponding to the road 350' predicted by the prediction module 150. If the actual sensor readings are within the range of the dynamic limits 170d, then the processor 102 may determine that the sensor readings are plausible. If the actual sensor readings are not within the range of the dynamic limits 170d then the processor 102 may determine that the sensor readings are not plausible.

In the example shown, the actual sensor readings determined by the sensors 62a-62n may indicate that the vehicle 50 has a negative yaw value. For example, the negative yaw value may be indicative of a left turn and/or a left curve for the current road. However, the road characteristics of the road 352' may not indicate a curve (e.g., the road characteristics may correspond to a straight road). The processor 102 may compare the actual sensor data to the dynamic limits 170d, which may indicate that the sensor data is not plausible. However, the skid scenario is an unexpected orientation. With the unexpected orientation, the actual sensor data determined by the sensors 62a-62n is correct (e.g., plausible).

In some embodiments, the apparatus 100 may be configured to check for an unexpected orientation (or emergency situation) before and/or after comparing the actual sensor data to the dynamic limits 170d. By checking for the unexpected orientation, the apparatus 100 may prevent a false negative reading (e.g., determining that the sensor readings are not plausible based on the road conditions when the sensor readings are actually correct because the vehicle 50 is not traveling the road 352' as expected).

In one example, the module 100 may check for an unexpected orientation by checking one of the sensors 62a-62n. For example, during the skid scenario 350', the wheel rotational speed may not match an expected vehicle speed and may indicate that the vehicle 50 is in a skid. In another example, the module 100 may determine whether one or more of the actuators 64a-64n are activated (e.g., an anti-lock braking system is engaged). In yet another example, the signal GPS may provide location information and the unexpected scenario may be determined by the location of the vehicle 50 with respect to the road 352' (e.g., the vehicle 50 may have traveled off the road entirely). In still another example, computer vision using vehicle cameras (e.g., one or more of the sensors 62a-62n) may be used to determine the unexpected orientation. In one example, vehicle-to-vehicle communication and/or vehicle-to-infrastructure may be used to determine the unexpected orientation scenario. The method of determining whether the vehicle 50 is in an unexpected orientation scenario may be varied according to the design criteria of a particular implementation.

Figure 8:
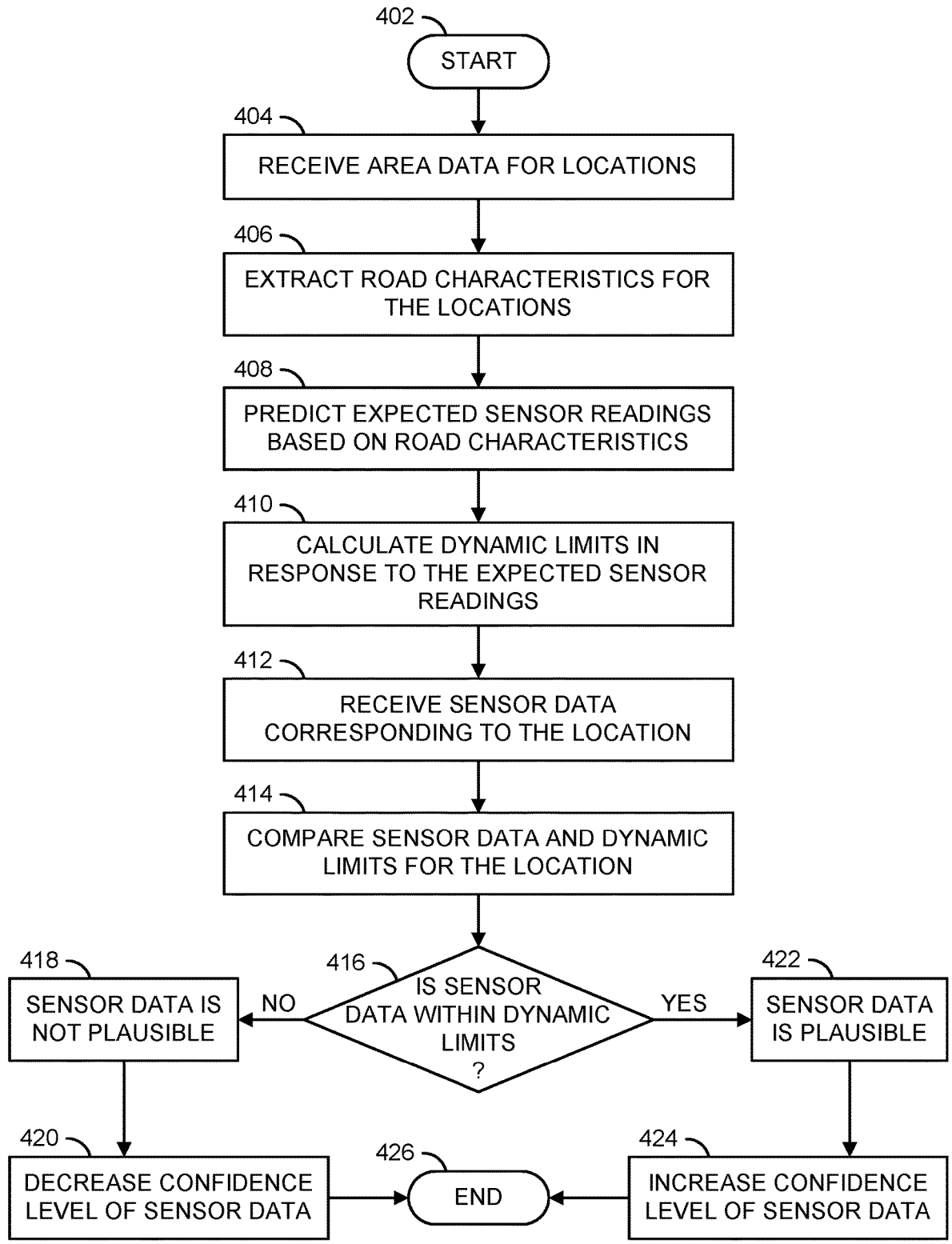
FIG. 8 is a flow diagram illustrating a method for adjusting a confidence level in response to a plausibility of sensor data.

Referring to FIG. 8, a method (or process) 400 is shown. The method 400 may adjust a confidence level in response to a plausibility of sensor data. The method 400 generally comprises a step (or state) 402, a step (or state) 404, a step (or state) 406, a step (or state) 408, a step (or state) 410, a step (or state) 412, a step (or state) 414, a decision step (or state) 416, a step (or state) 418, a step (or state) 420, a step (or state) 422, a step (or state) 424, and a step (or state) 426.

The step 402 may start the method 400. In the step 404, the I/O interface 104 may receive the area data for one or more locations. For example, the area data may correspond to locations beyond the useable (or visible) range of the vehicle sensors 62a-62n. In some embodiments, the memory 106 may store the area data (e.g., the data may be pre-loaded and the signal GPS may not be received). Next, in the step 406, the road extraction module 152 may extract the road characteristics for the locations using the area data. In the step 408, the prediction module 150 may predict expected sensor readings for the locations based on the road characteristics. Next, the method 400 may move to the step 410.

In the step 410, the prediction module 150 may calculate the dynamic limits 170d for the sensor data in response to the expected sensor readings. Next, in the step 412, the I/O interface 104 may receive the sensor data (e.g., current, actual sensor readings) corresponding to a current location of the vehicle 50. In the step 414, the processor 102 may compare the sensor data (e.g., current, actual sensor readings) and the dynamic limits 170d for the location. Next, the method 400 may move to the decision step 416.

In the decision step 416, the processor 102 may determine whether the sensor data is within the dynamic limits 170d. If the sensor data is not within the dynamic limits 170d, the method 400 may move to the step 418. In the step 418, the processor 102 may determine that the sensor data is not plausible. Next, in the step 420, the processor 102 may decrease a confidence level of the sensor data. Next, the method 400 may move to the step 426.

In the decision step 416, if the sensor data is within the dynamic limits 170d, the method 400 may move to the step 422. In the step 422, the processor 102 may determine that the sensor date is plausible. Next, in the step 424, the processor 102 may increase the confidence level of the sensor data. In some embodiments, the increased confidence level may increase an ASIL for the vehicle 50. Next, the method 400 may move to the step 426. The step 426 may end the method 400.

Figure 9:
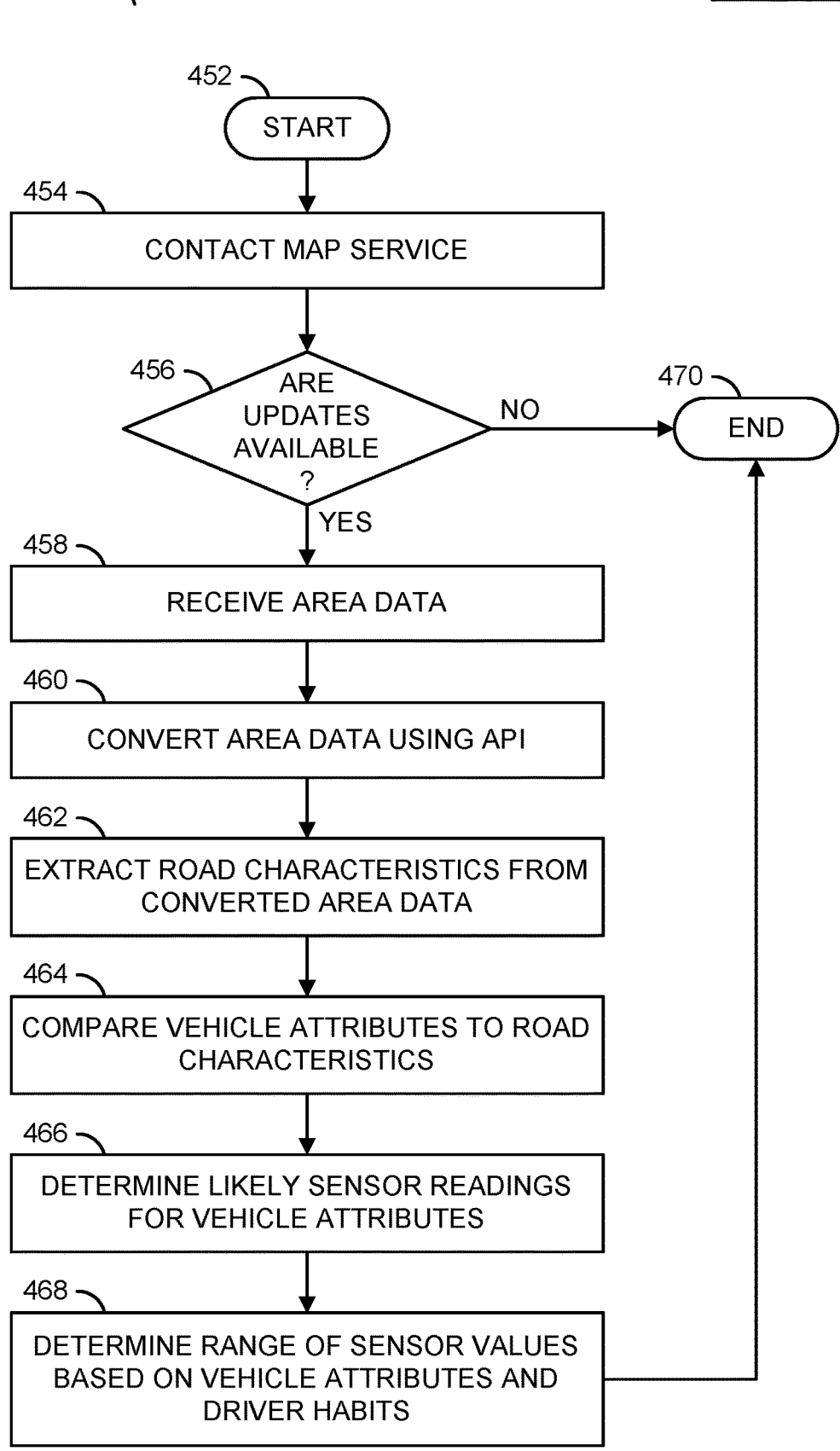
FIG. 9 is a flow diagram illustrating a method for extracting road characteristics.

Referring to FIG. 9, a method (or process) 450 is shown. The method 450 may extract road characteristics. The method 450 generally comprises a step (or state) 452, a step (or state) 454, a decision step (or state) 456, a step (or state) 458, a step (or state) 460, a step (or state) 462, a step (or state) 464, a step (or state) 466, a step (or state) 468, and a step (or state) 470.

The step 452 may start the method 450. Next, in the step 454, the module 100 may contact the map service. For example, the antenna 120 may contact a third-party service. Next, the method 450 may move to the decision step 456. In the decision step 456, the module 100 may determine whether updates are available. If not, the method 450 may move to the step 470. If updates are available, the method 450 may move to the step 458.

In the step 458, the module 100 may receive the area data. Next, in the step 460, the road extraction module 152 may convert the area data using an API. For example, the API may be defined by the third-party service and/or the area data may be provided in a particular (e.g., standardized) data module format. Next, in the step 460, the road extraction module 152 may extract the road characteristics from the converted area data. For example, the road extraction module 152 may determine an ADAS horizon for locations that may be beyond the visibility of the sensors 62a-62n. Next, the method 450 may move to the step 464.

In the step 464, the prediction module 150 may compare attributes of the vehicle 50 (e.g., size, shape, aerodynamics, engine capabilities, braking capabilities, maneuverability, etc.) to the road characteristics. Next, in the step 466, the prediction module 150 may determine likely sensor readings for the attributes of the vehicle 50. In the step 468, the prediction module 150 may determine a range of sensor values based on the vehicle attributes and/or driver habits. For example, the module 100 may track driver habits (e.g., a driver may often accelerate quickly, drive slowly, brake hard, etc.). The range of sensor readings may be used as the dynamic limits 170d. Next, the method 450 may move to the step 470. The step 470 may end the method 450.

The area data may be provided in a format compatible with an API (e.g., provided in a standardized format). For example, the road extraction module 152 may be configured to implement the API. In some embodiments, the area data may be provided by a GNSS network. In some embodiments, the area data may be provided by a map and/or ADAS service. In one example, the area data may be generated by a proprietary service (e.g., requiring a subscription to access). In another example, the area data may be generated as open source data. In yet another example, the area data may be crowd-sourced data.

Figure 10:
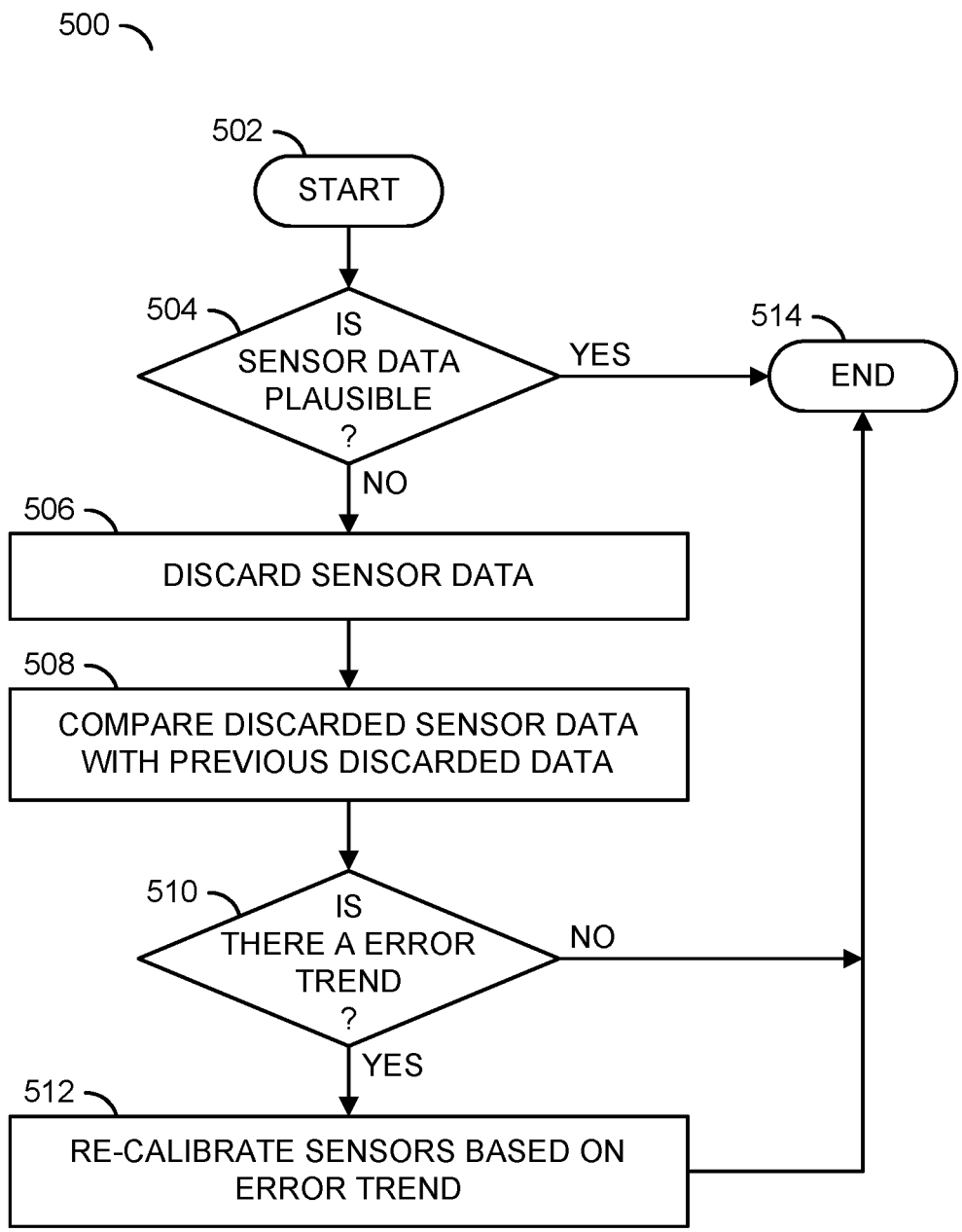
FIG. 10 is a flow diagram illustrating a method for re-calibrating sensors in response to sensor data errors.

Referring to FIG. 10, a method (or process) 500 is shown. The method 500 may re-calibrate sensors in response to sensor data errors. The method 500 generally comprises a step (or state) 502, a decision step (or state) 504, a step (or state) 506, a step (or state) 508, a decision step (or state) 510, a step (or state) 512, and a step (or state) 514.

The step 502 may start the method 500. Next, the method 500 may move to the decision step 502. In the decision step 504, the processor 102 may determine whether the sensor data is plausible. If the sensor data is plausible, the method 500 may move to the step 514. If the sensor data is not plausible, the method 500 may move to the step 506.

In the step 506, the processor 102 may discard the sensor data. The sensor data may be discarded for driving purposes (e.g., may not be provided as feedback to the driver, may not be used for autonomous driving, etc.). The discarded data may still be stored in the memory 106. For example, discarded data may be a flag, label and/or metadata indicating that particular sensor data may be unreliable and/or have a low level of confidence. Next, in the step 508, the processor 102 may compare the current discarded sensor data with previously discarded sensor data (e.g., stored in the memory 106). Next, the method 500 may move to the decision step 510.

In the decision step 510, the processor may determine whether there is an error trend. For example, the error trend may indicate that one or more of the readings from the sensors 62a-62n are drifting by a particular amount. If there is not an error trend, the method 500 may move to the step 514. If there is an error trend, the method 500 may move to the state 512. In the state 512, the processor 102 may re-calibrate the sensors 62a-62n (or sensor data received from the sensors 62a-62n) based on the error trend. For example, the processor 102 may apply a correction factor to data received from the sensors 62a-62n to compensate for the error trend. Next, the method 500 may move to the step 514. The step 514 may end the method 500.

Figure 11:
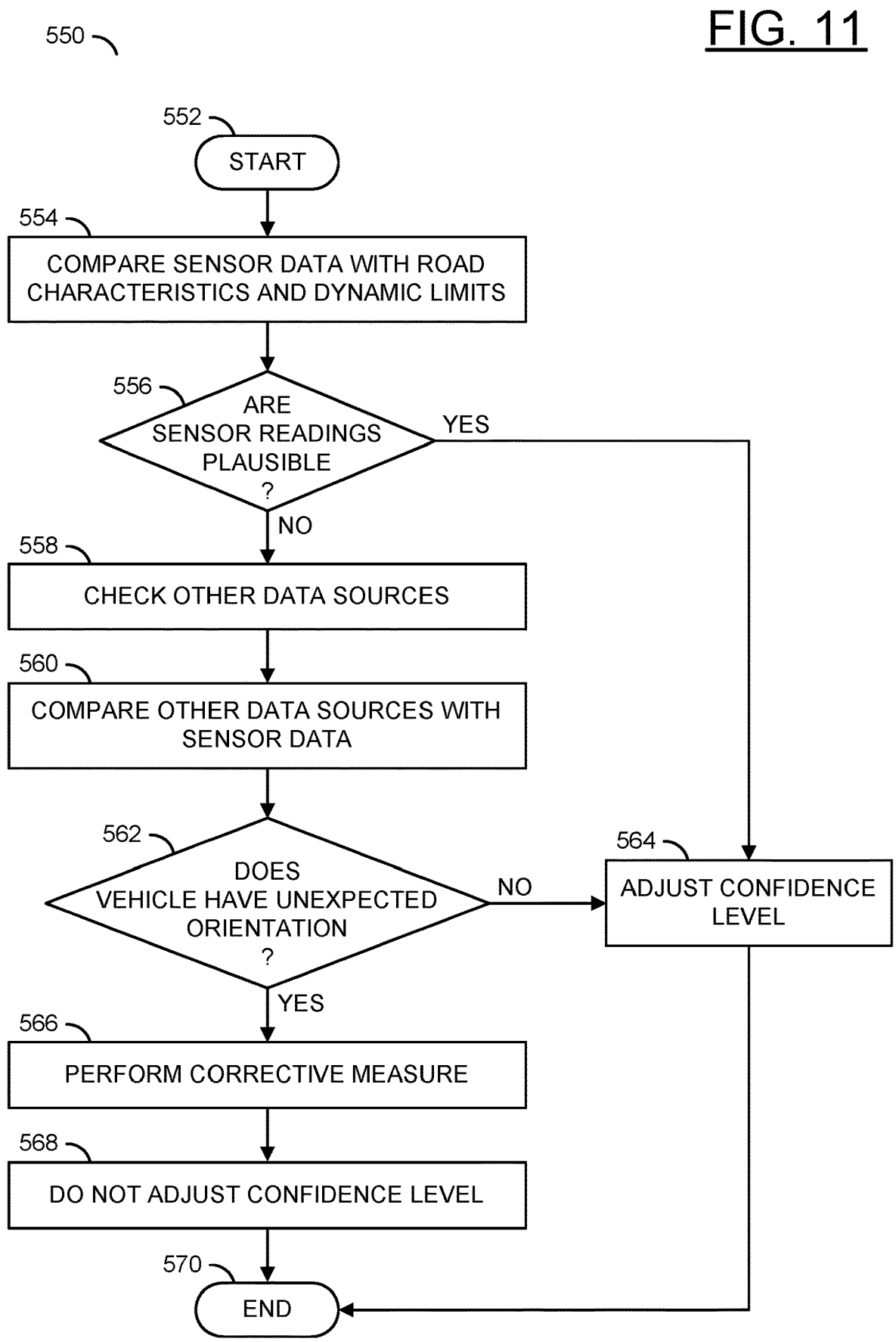
FIG. 11 is a flow diagram illustrating a method for preventing confidence level adjustments.

Referring to FIG. 11, a method (or process) 550 is shown. The method 550 may prevent confidence level adjustments. The method 550 generally comprises a step (or state) 552, a step (or state) 554, a decision step (or state) 556, a step (or state) 558, a step (or state) 560, a decision step (or state) 562, a step (or state) 564, a step (or state) 566, a step (or state) 568, and a step (or state) 570.

The step 552 may start the method 550. In the step 554, the processor 102 may compare the sensor data with the road characteristics 170c and/or the dynamic limits 170d. Next, the method 550 may move to the decision step 556. In the decision step 556, the processor 102 may determine whether the sensor readings are plausible. If the sensor readings are plausible, the method 550 may move to the step 564. If the sensor readings are not plausible, the method 550 may move to the step 558.

In the step 558, the processor 102 may check other data sources (e.g., the actuators 64a-64n, vehicle-to-vehicle communication, other sensor readings, etc.). In the step 560, the processor 102 may compare the other data sources with the sensor data. Next, the method 550 may move to the decision step 562.

In the decision step 562, the processor 102 may determine whether the vehicle 50 is in an unexpected orientation (e.g., loss of control, a spinout, a skid, etc.). If the vehicle 50 is not in an unexpected orientation, the method 550 may move to the step 564. In the step 564, the processor 102 may adjust the confidence level of the sensor data (e.g., increase if plausible, decrease if not plausible). Next, the method 550 may move to the step 570.

In the decision step 562, if the vehicle 50 is in an unexpected orientation, the method 550 may move to the step 566. In the step 566, the module 100 may enable a corrective measure to be performed (e.g., if autonomous capabilities are enabled, such as steering correction and object avoidance and/or if mitigation measures are available such as airbag deployment, automatically contacting emergency services, etc.). Next, in the step 568, the processor 102 may not adjust the confidence level. Since the sensor data correctly identified the unexpected orientation, the sensor data may be accurate even though not within the dynamic limits 170d. Next, the method 550 may move to the step 570. The step 570 may end the method 550.

The confidence level may be determined by the processor 102 to indicate a reliability of the sensor data. In some embodiments, the confidence level may correspond to an ASIL. In some embodiments, the confidence level may be used to select automatic responses performed by the vehicle 50. For example, the automatic responses may be mitigation measures. In another example, the automatic responses may be a corrective measure. In yet another example, the automatic responses may be decisions made in an autonomous (or semi-autonomous) driving scenario. The confidence level may be applicable to each of the sensors 62a-62n and/or to the sensor data as a whole. The amount of increase in the confidence level in response to a plausible determination and/or an amount of decrease in the confidence level in response to an implausible determination may be varied according to the design criteria of a particular implementation.

The map data received from the signal GPS may comprise GPS data, GNSS data, and/or road information. The road extraction module 152 may be configured to determine and/or extract the road characteristics from the map data. The road characteristics may comprise road attribute information such as slope (e.g., incline/decline), bank angle, crown, turn radius, etc. The prediction module 150 may be configured to use the road characteristics to establish plausibility criteria for inertial sensors (e.g., the sensors 62a-62n). For example, the prediction module 150 may calculate expected excitations of one or more of the sensors 62a-62n for the conditions indicated by the road characteristics. The prediction module 150 may calculate the dynamic limits 170d for the expected excitations of the sensors 62a-62n. The dynamic limits 170d may be used to determine the plausibility of the actual sensor data and/or ensure that the output is reasonable and of acceptable quality.

The road characteristics may be used to calculate the dynamic limits 170d. In one example, the road characteristics and/or the map data 170c may be stored (e.g., pre-loaded) into the memory 106. In another example, the road characteristics and/or the map data 170c may be received (e.g., from third-party services) in real-time. For example, the road characteristics and/or the map data 170c may be received from a group such as ADASIS. The dynamic limits 170d (e.g., plausibility limits) may be based on calculations from a local frame of reference and/or a global frame of reference.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   an interface configured to receive (i) area data and (ii) sensor data from a plurality of vehicle sensors; and
   a processor configured to
   (i) extract road attribute information of a road for a particular location from said area data, said road attribute information comprising one or more characteristics that excite said vehicle sensors as a vehicle reaches said particular location,
   (ii) predict expected readings of said vehicle sensors at said particular location based on said road attribute information, wherein said vehicle sensors comprise inertial sensors to read forces acting on said vehicle,
   (iii) calculate a range of likely readings of said vehicle sensors for said particular location of said road to store as dynamic limits and
   (iv) determine a plausibility of said sensor data received from said interface when said vehicle reaches said particular location of said road,
   wherein (a) said sensor data is plausible if said sensor data is within said dynamic limits and (b) a confidence level of said sensor data is adjusted in response to said plausibility of said sensor data.

2. The apparatus according to claim 1, wherein said vehicle implements one or more automatic responses based on said confidence level.

3. The apparatus according to claim 1, wherein said confidence level is an Automotive Safety Integrity Level (ASIL).

4. The apparatus according to claim 1, wherein said road attribute information comprises at least one of a turn radius, a bank angle, a road incline, and a road decline.

5. The apparatus according to claim 1, wherein said sensor data is used to calculate at least one of acceleration on an x axis, an acceleration on a z axis, an acceleration on a y axis, a pitch, a yaw, and a roll of said vehicle.

6. The apparatus according to claim 1, wherein said confidence level of said sensor data is increased when said sensor data is plausible.

7. The apparatus according to claim 1, wherein said vehicle sensors are calibrated in response to said confidence level.

8. The apparatus according to claim 1, wherein said sensor data from said vehicle sensors is discarded in response to said confidence level.

9. The apparatus according to claim 1, wherein said processor is further configured to (i) determine whether said vehicle has an unexpected orientation and (ii) prevent adjusting said confidence level if said vehicle has said unexpected orientation.

10. The apparatus according to claim 1, wherein said area data is received from a GNSS data service.

11. The apparatus according to claim 1, wherein said area data is received from a map service.

12. The apparatus according to claim 1, wherein said dynamic limits comprise a range of said expected readings of said vehicle sensors.

13. The apparatus according to claim 1, wherein said vehicle sensors comprise at least one of video cameras, LIDAR, speed sensors, vibration sensors, triaxial sensors, magnetometers, temperature sensors, gyroscopes, radar, and accelerometers.

14. The apparatus according to claim 1, wherein said processor is further configured to (i) determine said area data based on sensor data and (ii) provide updates about said area data.

15. The apparatus according to claim 1, wherein said road attribute information comprises information about said particular location corresponding to an ADAS horizon data model.

16. The apparatus according to claim 1, wherein said road attribute information are determined for locations beyond a usable range of said vehicle sensors.

17. The apparatus according to claim 1, wherein said vehicle sensors comprise sensors located on said vehicle that moves along said road.

* * * * *